United States Patent [19]
Ono et al.

[11] Patent Number: 6,010,578
[45] Date of Patent: Jan. 4, 2000

[54] FLUX FOR BRAZING ALUMINUM MEMBERS

[75] Inventors: Makoto Ono; Masahiro Hattori, both of Osaka; Eiji Itaya; Yutaka Yanagawa, both of Tokyo, all of Japan

[73] Assignee: Morita Chemical Industry Co., Ltd., Osaka, Japan

[21] Appl. No.: 08/977,228

[22] Filed: Nov. 24, 1997

[30] Foreign Application Priority Data

Nov. 28, 1996 [JP] Japan ..................... 8-334676
Jan. 23, 1997 [JP] Japan ..................... 9-025999

[51] Int. Cl.$^7$ ................................. B23K 35/363

[52] U.S. Cl. ..................... 148/26; 228/262.51

[58] Field of Search .............. 148/26; 228/262.51

[56] References Cited

U.S. PATENT DOCUMENTS

| | | | |
|---|---|---|---|
| 4,888,067 | 12/1989 | Sato et al. | 148/26 |
| 4,923,530 | 5/1990 | Miki et al. | 148/26 |
| 5,226,974 | 7/1993 | Conn | 148/26 |

*Primary Examiner*—George Wyszomierski
*Attorney, Agent, or Firm*—Koda & Androlia

[57] ABSTRACT

A flux for brazing aluminum members comprising potassium tetrafluoroaluminate, potassium pentafluoroaluminate and oxyfluoroaluminum, accomplishing the brazing of aluminum members at temperatures 5° C. to 20° C. lower than the temperature of conventional brazing that uses fluoride fluxes. Thus, heating energy required for the brazing can thus be saved, and conventional brazing equipment can be used as it is, in principle, without any changes; and since no expensive elements are used in the fluxes, the cost of brazing aluminum members can be reduced.

5 Claims, 5 Drawing Sheets

FLUX FOR BRAZING ALUMINUM MEMBERS

BACKGROUND OF THE INVENTION

1. Field of the Invention

The present invention relates to a fluoride base flux used for brazing aluminum members comprising aluminum or aluminum alloys.

2. Prior Art

In recent years, aluminum equipment used for heat exchangers, such as radiators and oil coolers of automobiles, condensers and evaporators of air conditioners and the like are generally fabricated by a brazing process. It is known that fluxes of chlorides or fluorides are usually used for brazing these aluminum members.

These fluxes are required to have such characteristics as having a lower melting point than aluminum members and brazing materials, having a cleaning effect for eliminating oxides or contaminants on the surfaces of the aluminum members, and having no corrosive properties against the aluminum members after brazing.

However, a drawback of chloride fluxes is that they need to be washed out with water after brazing since they are corrosive against the aluminum members or brazing materials.

On the other hand, fluoride fluxes do not have any corrosive properties against the aluminum members, and therefore, they do not need to be washed out. Thus, in recent years, the fluoride fluxes have been increasingly used for brazing aluminum members.

As fluxes of fluorides currently used for brazing aluminum members in a furnace of non-oxidative atmosphere, the following patents have been disclosed and known:

1. U.S. Pat. No. 3,951,328: A flux comprising potassium fluoroaluminate such as $KAlF_4$ and $K_3AlF_6$ with an AlF3/KF ratio of about 65:35 to 45:55 and having a melting point of about 560° C. or higher;
2. U.S. Pat. No. 4,579,605: A flux comprising 5 to 95 wt % of $K_2AlF_5$ or $K_2AlF_5.H_2O$ and the remainder of $KalF_4$; and
3. U.S. Pat. No. 5,450,666: A flux containing at least 96 wt % of $KAlF_4$; and the like.

However, as can be understood from FIG. 1, these fluxes have a minimum melting point of 560° C.; and, when composed of $KAlF_4$ only, the melting point is 574° C.

With the recent years' requirement for reducing the brazing cost, there has been a demand for developing a flux that has a lower melting point so as to save brazing energy.

In order to accomplish this object, the addition of cesium fluoride (CsF) or lithium fluoride (LiF) to the flux system, or the use of a system comprising these compounds and aluminum fluoride ($AlF_3$) have been proposed (for example, U.S. Pat. No. 4,556,165 and U.S. Pat. No. 4,689,092).

However, because cesium (Cs) and lithium (Li) are very expensive elements, these methods do not reduce the brazing cost, which is a disadvantage, even if they are able to lower the melting point.

SUMMARY OF THE INVENTION

Accordingly, the object of the present invention is to provide a flux in which one or more compounds of oxyfluoroaluminum and hydroxyfluoroaluminum are added to potassium fluoroaluminate that is one of the conventional KF—$AHF_3$ base fluxes for brazing aluminum members; and in particular, the object of the present invention is to provide a flux which is able to lower the melting point below the minimum melting point (560° C.) of the KF—$AlF_3$ base fluxes without using expensive materials.

The flux for brazing aluminum members according to the present invention is characterized in that it contains one or more compounds of potassium tetrafluoroaluminate, potassium pentafluoroaluminate and potassium hexafluoroaluminate, and one or more compounds of oxyfluoroaluminum and hydroxyfluoroaluminum. It is preferable that the flux has a physical property in which the melting point is 540 to 560° C.

DETAILED DESCRIPTION OF THE PREFERRED EMBODIMENTS

The flux for brazing aluminum members according of the present invention contains one or more compounds of potassium tetrafluoroaluminate, potassium pentafluoroaluminate and potassium hexafluoroaluminate, and one or more compounds of oxyfluoroaluminum and hydroxyfluoroaluminum. In addition, the flux has a melting point of 540 to 560° C.

In particular, potassium tetrafluoroaluminate, potassium pentafluoroaluminate, potassium hexafluoroaluminate, oxyfluoroaluminum and hydroxyfluoroaluminum correspond, respectively, to compounds represented by the following chemical formulae:

Potassium tetrafluoroaluminate: $KAF_4$
Potassium pentafluoroaluminate: $K_2AlF_5$, $K_2AlF_5.H_2O$
Potassium hexafluoroaluminate: $K_3AlF_6$
Oxyfluoroaluminum: $Al_2F_4O$, $AlFO$
Hydroxyfluoroaluminum: $AlF_2(OH)$, $AlF_2(OH).H_2O$, $AlF(OH)_2$ For obtaining the flux of the present invention, a prescribed amount of hydrofluoric acid (HF) is first reacted with aluminum hydroxide ($Al(OH)_3$) or aluminum oxide ($Al_2O_3$) at a temperature of 60° C. to 90° C., preferably 60° C. to 80° C., so as to form a solution of a-aluminum fluoride; and then potassium hydroxide (KOH) is added to the solution at a temperature range of 60° C. to 100° C., preferably 90° C. to 100° C., while adjusting the pH of the resulting synthesized solution to within a range of 5 to 10. Thus, the synthesis can be completed in a single reaction vessel.

Hydroxyfluoroaluminum can be synthesized by adding potassium hydroxide (KOH) in the same molar number as hydroxyfluoroaluminum in addition to the amount required for desired composition and by adjusting the pH to the range of 5 to 10, by which the formation of aluminum fluoride ($AlF_3.3H_2O$) is suppressed.

The flux of the present invention can be produced in an arbitrary mixing ratio by drying the separated crystals, which is obtained by filtering the synthesis, at a temperature of 80° C. or higher.

Figure 1:
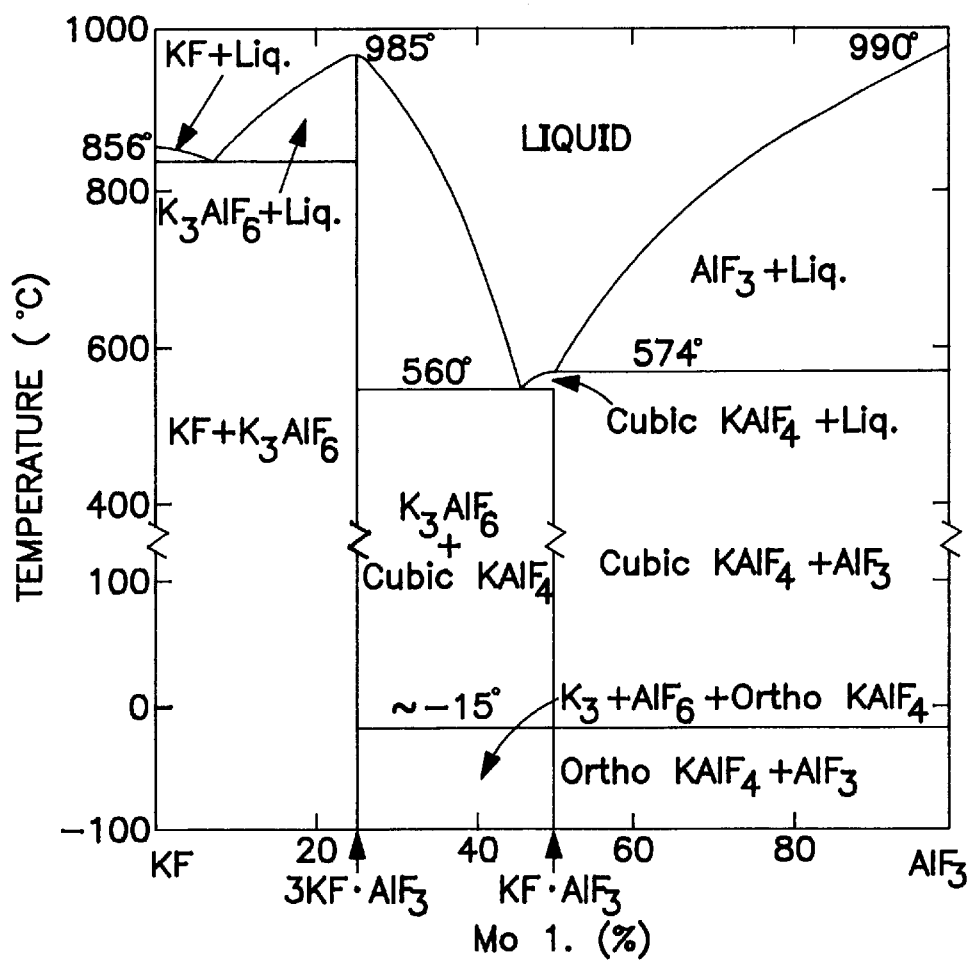
FIG. 1 is a phase diagram of a potassium fluoride (KF)—aluminum fluoride ($AlF_3$) binary system.
Figure 2:
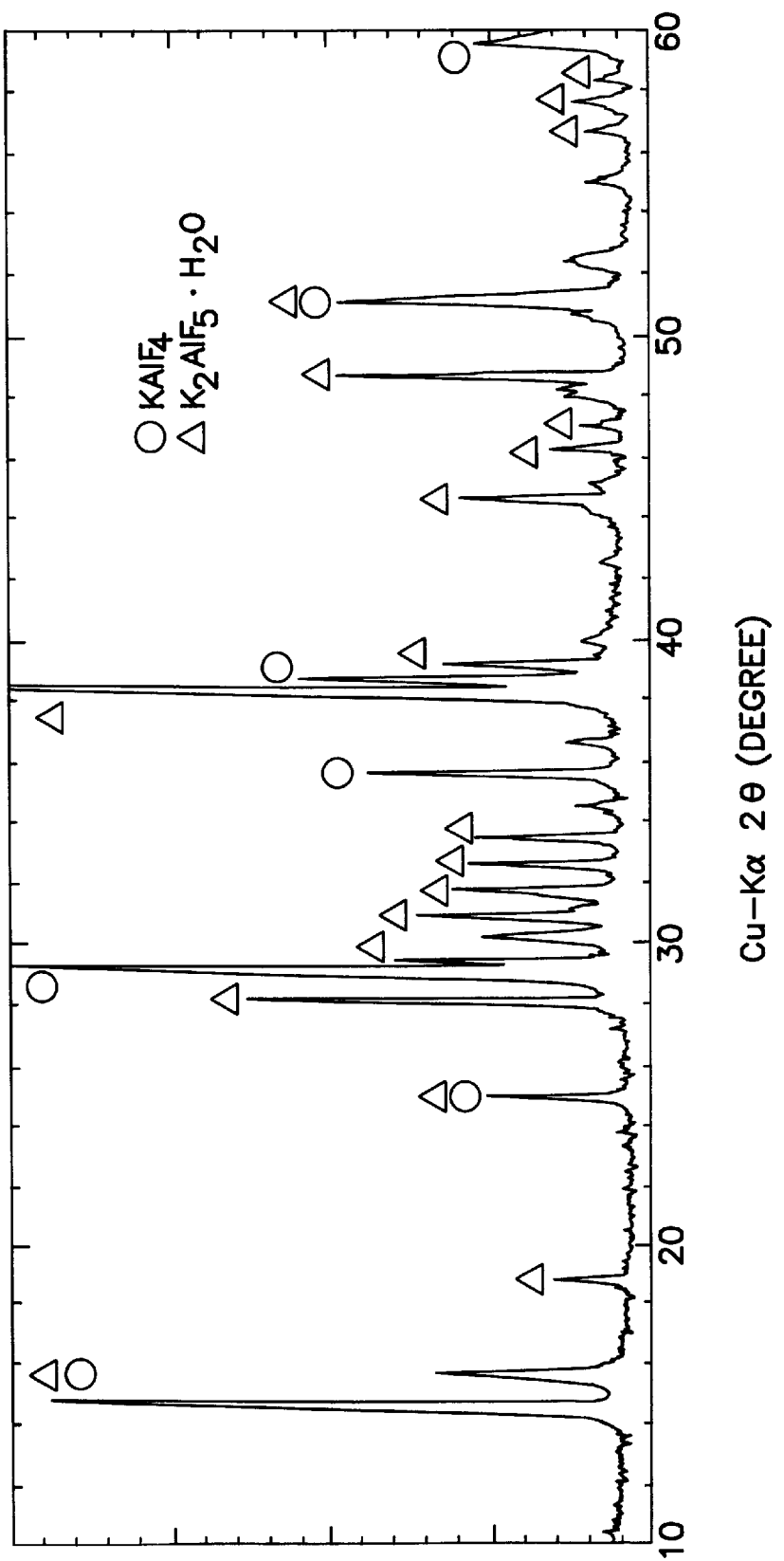
FIG. 2 is an X-ray diffraction chart of Example 1, where the ○ mark denotes $KAlF_4$, the △ mark denotes $K_2AlF_5H_2O$ and peaks without any marks are of $AlF_2(OH)$.
Figure 3:
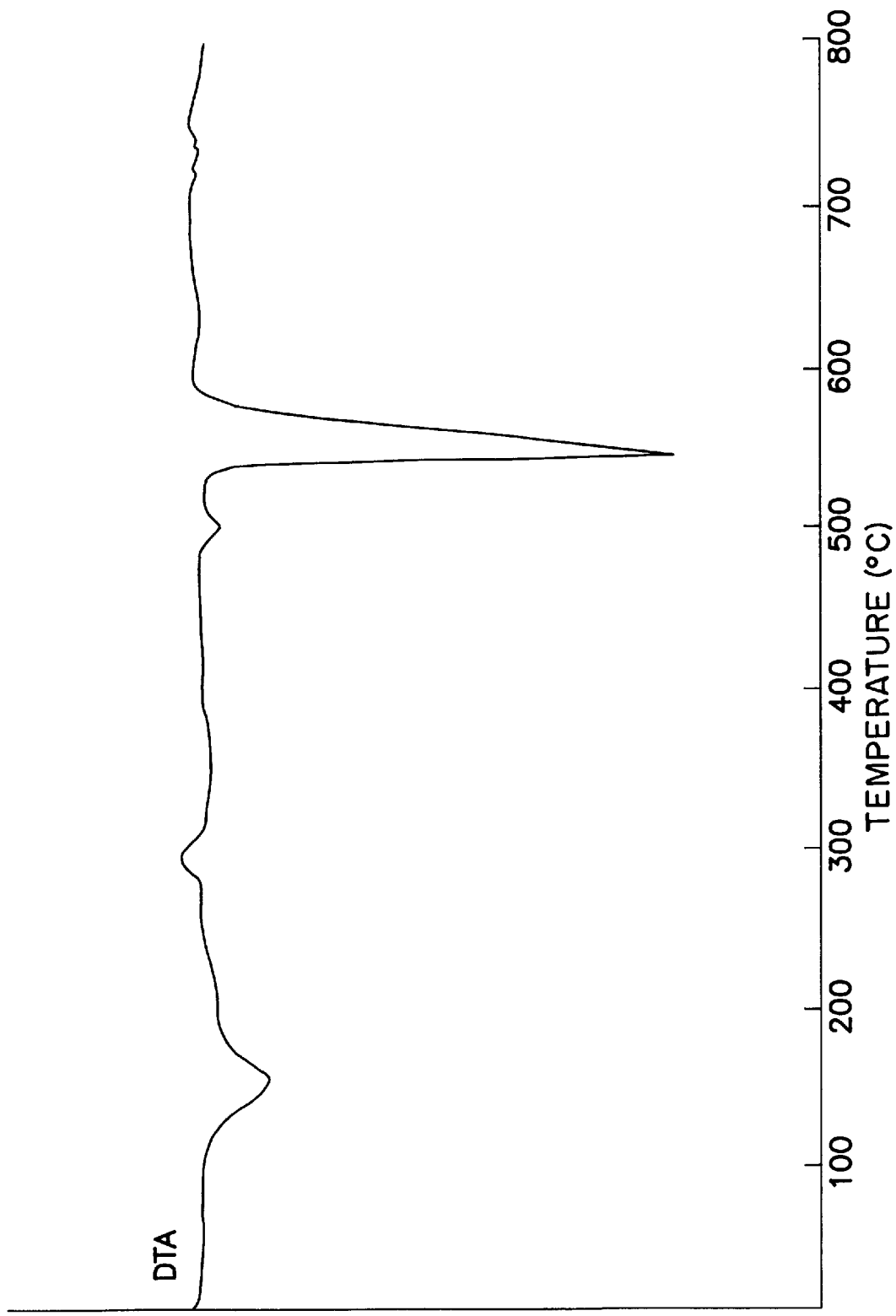
FIG. 3 is a graph showing a thermo-balance DTA curve of Example 1, depicting the melting point of the flux.

A measurement of the composition by X-ray diffraction, a measurement of the contents of aluminum (Al) and potassium (K) by ICP atomic absorption spectra and an analysis of the content of fluoride by titration with thorium nitrate using alizarinesulfonicsodium as an indicator indicate that the flux of the present invention is a mixture of potassium tetrafluoroaluminate, potassium pentafluoroaluminate and hydroxyfluoroaluminum. In addition, a thermal analysis indicates that the flux of the present invention has a melting point in the range of 540° C. to 560° C. as seen from FIGS. 2 and 3.

The flux, although dehydrated by heating to 300° C. or higher, shows no change in its melting point. In this regard, it is known that potassium pentafluoroaluminate, when heated to 400° C. or higher, is decomposed into potassium tetrafluoroaluminate and potassium A hexafluoroaluminate at a molar ratio of 1:1.

The reaction formulae can be elucidated as follows:

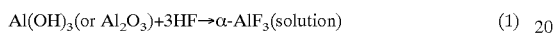
$$Al(OH)_3 (or\ Al_2O_3) + 3HF \rightarrow \alpha\text{-}AlF_3 (solution) \qquad (1)$$

pH4 or lower

$$\alpha\text{-}AlF_3 + KOH + HF \rightarrow KAlF_4 + H_2O \qquad (2)$$

pH4 or lower

$$KAlF_4 + KOH + HF \rightarrow K_2AlF_5 \cdot H_2O \qquad (3)$$

pH6 or higher

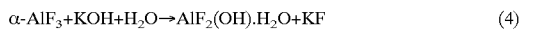
$$\alpha\text{-}AlF_3 + KOH + H_2O \rightarrow AlF_2(OH) \cdot H_2O + KF \qquad (4)$$

pH6 or higher

$$KAlF_4 + KF + H_2O \rightarrow K_2AlF_5 \cdot H_2O \qquad (5)$$

150° C. or higher 300° C. or higher

$$2AlF_2(OH) \cdot H_2O \rightarrow 2AlF_2(OH) + 2H_2O \rightarrow Al_2F_4O + H_2O \qquad (6)$$

90° C. or higher 400° C. or higher

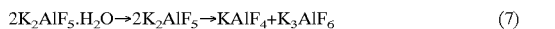
$$2K_2AlF_5 \cdot H_2O \rightarrow 2K_2AlF_5 \rightarrow KAlF_4 + K_3AlF_6 \qquad (7)$$

The flux of the present invention can be obtained by other synthetic methods.

In particular, the flux of the invention can be produced by mixing oxyfluoroaluminum or hydroxyfluoroaluminum: to a mixture of potassium fluoride (KF) and aluminum fluoride ($AlF_3$ or $AlF_3 \cdot 3H_2O$); to a reaction product of heating the mixture at 60° C. or higher after adding water, i.e., a mixture of potassium tetrafluoroaluminate and potassium pentafluoroaluminate; to a mire of potassium tetrafluoroaluminate and potassium hexafluoroaluminate; or to a product of making the above salts and mixing them.

Oxyfluoroaluminum can be obtained by a heat-decomposition of hydroxyfluoroaluminum to a temperature of 300° C. or higher. It can also be obtained by mixing aluminum oxide ($Al_2O$) or aluminum hydroxide ($Al(OH)_3$) with aluminum fluoride ($AlF_3$ or $AlF_3 \cdot 3H_2O$), or by heating the mixture, with water added, to 60° C. or higher.

The flux of the present invention can also be obtained by: mixing potassium tetrafluoroaluminate, potassium pentafluoroaluminate and potassium hexafluoroaluminate; adding water to prepared amounts of aluminum oxide ($Al_2O$) and aluminum fluoride ($AlF_3$ or $AlF_3 \cdot 3H_2O$); and then heating the mixture to 60° C. or higher.

The reaction formulae of aluminum oxide or aluminum hydroxide and aluminum fluoride is elucidated as follows:

Heating

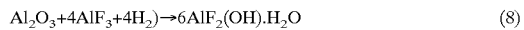
$$Al_2O_3 + 4AlF_3 + 4H_2) \rightarrow 6AlF_2(OH) \cdot H_2O \qquad (8)$$

Heating

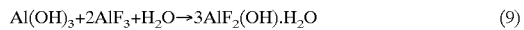
$$Al(OH)_3 + 2AlF_3 + H_2O \rightarrow 3AlF_2(OH) \cdot H_2O \qquad (9)$$

Hereinbelow, the present invention is described in further detail with reference to Examples 1 through 4.

Example 1

An aqueous solution of a-aluminum fluoride was prepared by adding 100 g of aluminum hydroxide (Al(OH)3) into 250 ml of water, and further adding 125 g of 70 wt % hydrofluoric acid (EF) under stirring in such a way that the temperature would not exceed 80° C. Subsequently, 163 g of an aqueous solution of 48 wt % potassium hydroxide was added to the above solution in such a way that the temperature would not exceed 95° C., thereby obtaining a synthetic slurry (pH 6). This synthetic solution was filtrated and dried at 80° C., by which a white powder was obtained.

This white powder was confirmed to contain $KAlF_4$ and $K_2AlF_5 \cdot H_2O$ from a measurement of X-ray diffraction (Cu—K$\alpha$), and the contents of Al and K were determined by ICP atomic absorption spectra. The content of F was assayed by titrating with thorium nitrate using alizarinesulfonicsodium as an indicator. A thermo-balance DTA assay revealed that the remaining component was $AlF_2(OH) \cdot H_2O$. The melting point of this white powder was measured with a DTA curve. As a result of heating this white powder for two (2) hours at 400° C., the powder proved to be a mixture of potassium tetrafluoroaluminate, potassium pentafluoroaluminate and oxyfluoroaluminum.

A brazing test was performed in the following manner:

Two (2) aluminum plates of JIS (Japanese Industrial Standard) 3003 with a thickness of 1 mm were combined in a T-shape, and at a side face of which was placed a JIS 4047 filler metal having a diameter of 1 mm. The aluminum plates were pre-heated at 200° C. in a furnace under a nitrogen atmosphere and, by raising the temperature of the furnace to 580° C., the two plates were brazed with each other by using a 5 wt % of slurry solution of the fluxes.

The compositions of the fluxes, which are obtained by this synthesis method using different amounts of materials and with the drying temperatures set differently between 80° C. to 400° C., and the results of brazing test, which are obtained from these fluxes, are listed in Table 1. As is apparent from Table 1, all the samples 1 to 23 are good for brazing properties, and moreover their melting points are within a range of 540° C. to 560° C.

Figure 4:
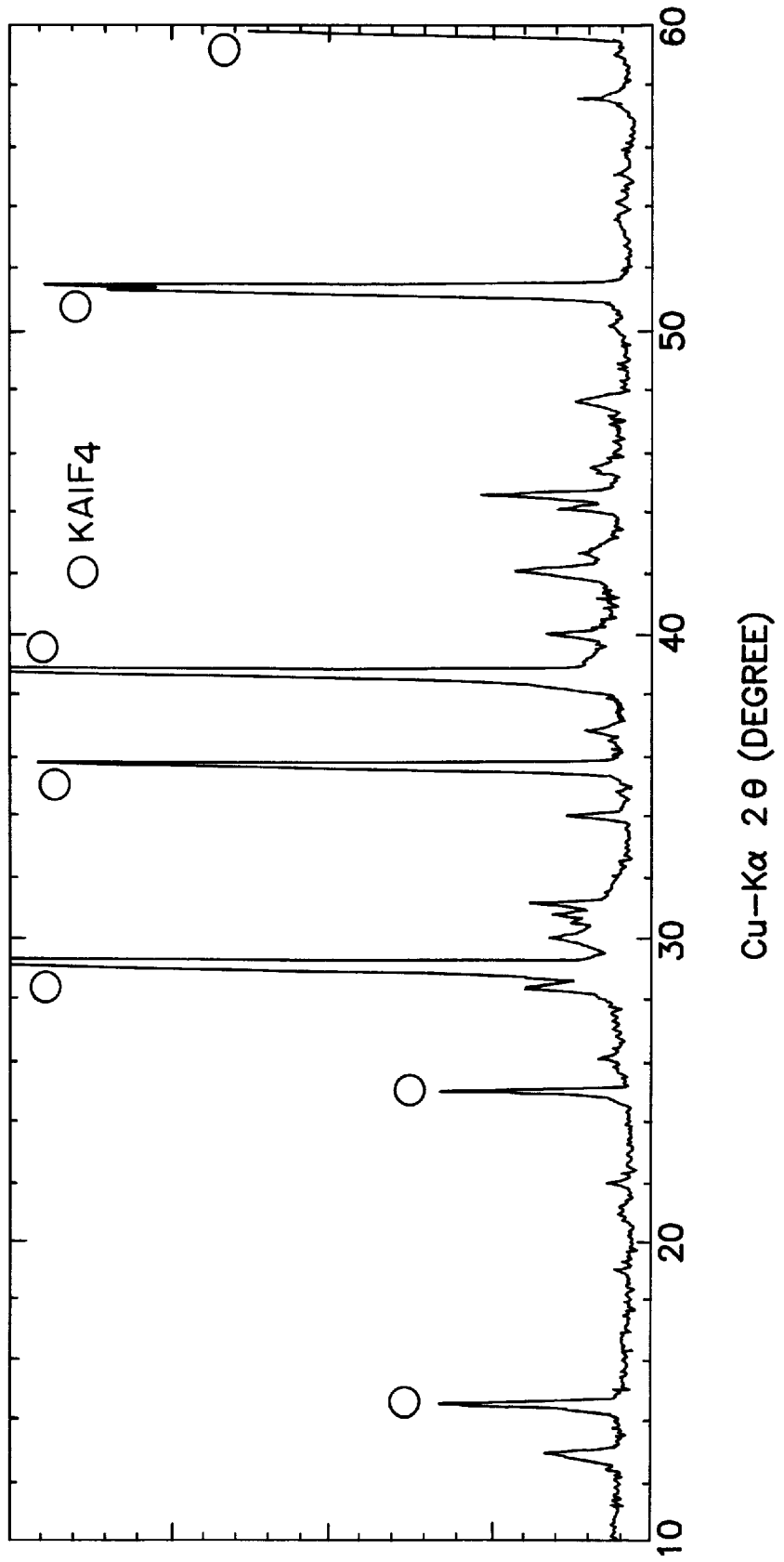
FIG. 4 is an X-ray diffraction chart of the flux of Example 1 after heating to 400° C.

FIG. 4 is an X-ray diffraction chart of the fluxes of Example 1 after heating them to 400° C. The presence of $KAlF_4$ and $Al_2F_4O$ is verified from FIG. 4, where $K_2AlF_5$ is in an amorphous form.

Figure 5:
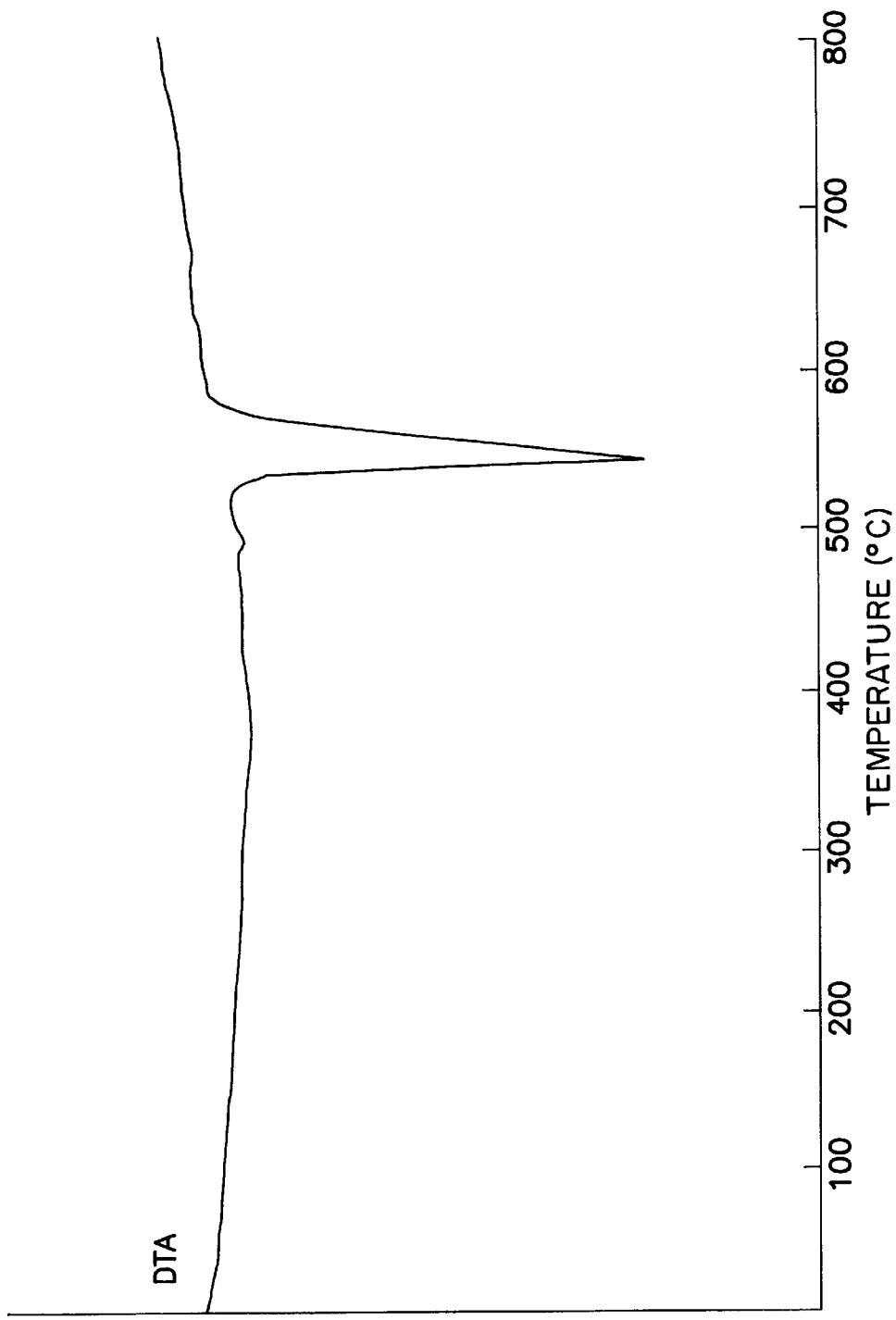
FIG. 5 is a graph showing a DTA curve of the flux of Example 1 after heating to 400° C.

FIG. 5 is a graph showing a DTA curve after heat-treating the fluxes of Example 1 at 400° C. FIG. 5 shows that there is no change in the melting point.

Example 2

15.6 g of aluminum hydroxide (Al(OH)$_3$) and 55.2 g of aluminum fluoride ($AlF_3 \cdot 3H_2O$) were mixed and crushed in a mortar. Then, after adding 70 ml of water, the mixture was evaporated to dryness at 150° C., by which 47 g of hydroxyfluoroaluminum represented by a chemical formula of AlF(OH)$_2$ was obtained. Also, by heating this hydroxyfluoroaluminum at 400° C., oxyfluoroaluminum represented by a chemical formula of AlFO was obtained.

Furthermore, 31.2 g of aluminum hydroxide (Al(OH)$_3$) and 27.6 g of aluminum fluoride (AlF$_3$.3H$_2$O) were mixed and crushed in a mortar, and 70 ml of water was added thereto. Then, the mixture was evaporated to dryness at 150° C., by which 49 g of hydroxyfluoroaluminum represented by a chemical formula of AlF$_2$(OH) was obtained. Also, by heating this hydroxyfluoroaluminum at 400° C., oxyfluoroaluminum represented by a chemical formula of Al$_2$F$_4$O was obtained.

Also, an aqueous solution of a-aluminum fluoride was prepared from 23.4 g of aluminum hydroxide (Al(OH)$_3$) and 34.3 g of 70 wt % hydrofluoric acid (BF). Then, 35.1 g of 48 wt % potassium hydroxide (KOH) was added into this solution, by which 42 g of potassium tetrafluoroaluminate was obtained.

In addition, an aqueous solution of α-aluminum fluoride was prepared from 15.6 g of aluminum hydroxide (Al(OH)$_3$) and 28.6 g of 70 wt% hydrofluoric acid (HF). After adding 46.8 g of 48 wt % potassium hydroxide (KOH), the crystals obtained were dried at 130° C., by which 40 g of potassium pentafluoroaluminate was obtained.

Further, an aqueous solution of α-aluminum fluoride was prepared from 15.6 g of aluminum hydroxide (Al(OH)3) and 34.3 g of 70 wt % hydrofluoric acid (HF). By adding 70.1 g of 48 wt % potassium hydroxide (KOH) to this solution, 40 g of potassium hexafluoroaluminate was obtained.

Then, fluxes were fabricated by mixing, at different ratios, these synthesized substances in a mortar.

A brazing test was performed in the following manner:

Two aluminum plates of JIS 3003 with a thickness of 1 mm were combined into a T-shape, and at a side face of which was placed a JIS 4047 filler metal having a diameter of 1 mm. The aluminum plates were pre-heated at 200° C. in a furnace under a nitrogen atmosphere and, by raising the temperature of the furnace to 580° C., the two plates were brazed with each other by using a 5 wt % of slurry solution of the fluxes.

The compositions of the fluxes thus obtained, and the results of the brazing test with these fluxes are listed in Tables 2 and 3. As is apparent from Tables 2 and 3, all the samples 27 to 103 are good for brazing properties, and moreover their melting points are within a range of 540° C. to 560° C.

Examples 3 and 4

First, 4.7 g of aluminum hydroxide (Al(OH)$_3$) and 16.5 g of aluminum fluoride (AlF$_3$. H$_2$O) were mixed into 40 g of a fluoride flux of the prior art (composition: KAlF$_4$:K$_2$AlF$_5$.H$_2$O=70:30), and crushed in a mortar. Thereafter, with 60 g of water added, the mixture was dried at different temperatures within the range of 150° C. to 500° C. No great changes were found in the melting point of each flux thus obtained.

In addition, 30 g of water was added into 22.5 g of aluminum fluoride (AlF$_3$) and 22.0 g of potassium fluoride (KF), and then dried at 100° C. To the resulting powder, 5.8 g of aluminum oxide (Al$_2$O$_3$) and 19.1 g of aluminum fluoride (AlF$_3$) were added to be mixed, and then crushed in a mortar. Thereafter, 60 g of water was added, and the mixture was dried at different temperatures within the range of 150° C. to 500° C. There were no great changes in the melting point of each flux thus obtained.

A brazing test was performed as follows:

Two aluminum plates of JIS 3003 with a thickness of 1 mm were combined into a T-shape, and at a side face of which was placed a JIS 4047 filler metal having a diameter of 1 mm. The aluminum plates were pre-heated at 200° C. in a furnace under a nitrogen atmosphere and, by raising the temperature of the furnace to 580° C., the two plates were brazed with each other by using a 5 wt % of slurry solution of the fluxes.

The composition of the fluxes thus obtained, and the results of brazing test with these fluxes are listed in Table 4. As is apparent from Table 4, all the samples 104 to 111 are good at brazing properties, and moreover their melting points are within a range of 540° C. to 560° C.

As seen from the above, with the fluxes of the present invention, brazing for aluminum members can be conducted at temperatures 5° C. to 20° C. lower than the temperature of the conventional brazing that uses fluoride fluxes. Thus, heating energy required for the brazing can be saved. Moreover, conventional brazing equipment can be used as it is, in principle, without any changes. Furthermore, since no expensive elements such as cesium (Cs) and lithium (Li) are used in the fluxes of the present invention, the fluxes contribute to reducing the cost of brazing aluminum members.

TABLE 1

| Flux | No. | Composition of Flux (wt %) | | | | | | | | Melting point, (° C.) | Brazeability in N$_2$ atm. |
| --- | --- | --- | --- | --- | --- | --- | --- | --- | --- | --- | --- |
|  |  | KAlF$_4$ | K$_2$AlF$_5$.H$_2$O | K$_2$AlF$_5$ | K$_3$AlF$_6$ | AlF(OH)$_2$ | AlFO | AlF$_2$(OH).H$_2$O | Al$_2$F$_4$O |  |  |
| Flux of Invention | 1 | — | 88 | — | — | — | — | 12 | — | 545.6 | excellent |
| Flux of Invention | 2 | 8 | 87 | — | — | — | — | 5 | — | 546.3 | " |
| Flux of Invention | 3 | 16 | 71 | — | — | — | — | 13 | — | 544.7 | " |
| Flux of Invention | 4 | 19 | 61 | — | — | — | — | 20 | — | 545.0 | " |
| Flux of Invention | 5 | 17 | 48 | — | — | — | — | 35 | — | 546.7 | " |
| Flux of Invention | 6 | — | 57 | — | — | — | — | 43 | — | 545.5 | " |

TABLE 1-continued

| Flux | No. | Composition of Flux (wt %) | | | | | | | | Melting point, (° C.) | Brazeability in N₂ atm. |
|---|---|---|---|---|---|---|---|---|---|---|---|
| | | KAlF₄ | K₂AlF₅.H₂O | K₂AlF₅ | K₃AlF₆ | AlF(OH)₂ | AlFO | AlF₂(OH).H₂O | Al₂F₄O | | |
| Flux of Invention | 7 | 13 | 42 | — | — | — | — | 45 | — | 546.6 | " |
| Flux of Invention | 8 | 34 | 35 | — | — | — | — | 31 | — | 546.7 | " |
| Flux of Invention | 9 | 42 | 44 | — | — | — | — | 14 | — | 548.1 | " |
| Flux of Invention | 10 | 72 | 26 | — | — | — | — | 2 | — | 556.5 | " |
| Flux of Invention | 11 | 17 | 48 | — | — | 12 | — | 23 | — | 546.7 | " |
| Flux of Invention | 12 | — | 57 | — | — | 14 | — | 29 | — | 545.5 | " |
| Flux of Invention | 13 | 34 | 35 | — | — | 10 | — | 21 | — | 546.7 | " |
| Flux of Invention | 14 | 18 | 52 | — | — | 30 | — | — | — | 546.4 | " |
| Flux of Invention | 15 | 16 | 18 | 26 | — | 18 | — | 22 | — | 545.9 | " |
| Flux of Invention | 16 | 19 | — | 51 | — | 22 | 8 | — | — | 546.2 | " |
| Flux of Invention | 17 | 36 | — | 34 | — | — | — | 19 | 11 | 546.6 | " |
| Flux of Invention | 18 | 21 | — | 63 | — | — | — | — | 16 | 545.0 | " |
| Flux of Invention | 19 | 38 | — | 36 | — | — | — | — | 26 | 546.6 | " |
| Flux of Invention | 20 | 21 | — | 53 | — | — | 26 | — | — | 546.7 | " |
| Flux of Invention | 21 | 20 | — | 50 | — | — | 11 | — | 19 | 546.6 | " |
| Flux of Invention | 22 | — | — | 62 | — | — | 13 | — | 25 | 545.6 | " |
| Flux of Invention | 23 | 38 | — | 36 | — | — | 9 | — | 17 | 546.7 | " |
| Flux of Prior Art | 24 | 70 | 30 | — | — | — | — | — | — | 562.2 | poor |
| Flux of Prior Art | 25 | 80 | — | — | 20 | — | — | — | — | 563.1 | " |
| Flux of Prior Art | 26 | 54 wt % AlF₃ – 46 wt % KF | | | | | | | | 562.7 | " |

TABLE 2

| Flux | No. | Composition of Flux (wt %) | | | | | | | Melting point, (° C.) | Brazeability in N₂ atm. |
|---|---|---|---|---|---|---|---|---|---|---|
| | | KAlF₄ | K₂AlF₅ | K₃AlF₆ | AlF(OH)₂ | AlFO | AlF₂(OH) | Al₂F₄O | | |
| Flux of Invention | 27 | 55 | — | 25 | — | 20 | — | — | 545.0 | excellent |
| Flux of Invention | 28 | 52 | — | 24 | 24 | — | — | — | 544.9 | " |
| Flux of Invention | 29 | 52 | — | 24 | — | — | — | 24 | 545.3 | " |
| Flux of Invention | 30 | 50 | — | 23 | — | — | 27 | — | 545.4 | " |
| Flux of Invention | 31 | 49 | — | 22 | 20 | — | 9 | — | 546.3 | " |
| Flux of Invention | 32 | 52 | — | 23 | — | 16 | — | 9 | 546.1 | " |
| Flux of Invention | 33 | 52 | — | 24 | 20 | 4 | — | — | 545.0 | " |
| Flux of Invention | 34 | 50 | — | 23 | — | — | 20 | 7 | 545.5 | " |
| Flux of Invention | 35 | 51 | — | 23 | — | 16 | 10 | — | 546.2 | " |
| Flux of Invention | 36 | 50 | — | 22 | 20 | — | — | 8 | 545.8 | " |
| Flux of Invention | 37 | 52 | — | 24 | 4 | 5 | 7 | 8 | 545.0 | " |
| Flux of Invention | 38 | — | 63 | 22 | — | 15 | — | — | 546.6 | " |

TABLE 2-continued

| Flux | No. | KAlF$_4$ | K$_2$AlF$_5$ | K$_3$AlF$_6$ | AlF(OH)$_2$ | AlFO | AlF$_2$(OH) | Al$_2$F$_4$O | Melting point, (° C.) | Brazeability in N$_2$ atm. |
|---|---|---|---|---|---|---|---|---|---|---|
| Flux of Invention | 39 | — | 60 | 21 | 19 | — | — | — | 546.4 | " |
| Flux of Invention | 40 | — | 55 | 25 | — | — | — | 20 | 546.3 | " |
| Flux of Invention | 41 | — | 51 | 23 | — | — | 26 | — | 546.3 | " |
| Flux of Invention | 42 | — | 30 | 48 | 19 | — | 3 | — | 546.9 | " |
| Flux of Invention | 43 | — | 32 | 51 | — | 15 | — | 2 | 546.9 | " |
| Flux of Invention | 44 | — | 55 | 24 | 17 | 4 | — | — | 546.2 | " |
| Flux of Invention | 45 | — | 54 | 25 | — | — | 18 | 3 | 546.3 | " |
| Flux of Invention | 46 | — | 32 | 50 | — | 15 | 3 | — | 546.7 | " |
| Flux of Invention | 47 | — | 61 | 21 | 5 | — | — | 13 | 546.8 | " |
| Flux of Invention | 48 | — | 65 | 20 | 3 | 2 | 6 | 4 | 546.1 | " |
| Flux of Invention | 49 | 41 | 39 | — | — | 20 | — | — | 545.1 | " |
| Flux of Invention | 50 | 21 | 53 | — | 26 | — | — | — | 546.7 | " |
| Flux of Invention | 51 | 21 | 63 | — | — | — | — | 16 | 545.0 | " |
| Flux of Invention | 52 | 18 | 46 | — | — | — | 36 | — | 546.7 | " |
| Flux of Invention | 53 | 36 | 36 | — | 3 | — | 25 | — | 545.2 | " |
| Flux of Invention | 54 | 39 | 39 | — | — | 2 | — | 20 | 545.2 | " |
| Flux of Invention | 55 | 21 | 54 | — | 19 | 6 | — | — | 546.6 | " |
| Flux of Invention | 56 | 18 | 47 | — | — | — | 20 | 15 | 546.4 | " |
| Flux of Invention | 57 | 20 | 50 | — | — | 10 | 20 | — | 546.1 | " |
| Flux of Invention | 58 | 18 | 54 | — | 7 | — | — | 21 | 546.0 | " |
| Flux of Invention | 59 | 34 | 35 | — | 7 | 6 | 10 | 8 | 545.6 | " |
| Flux of Invention | 60 | 65 | 21 | 8 | — | 6 | — | — | 547.8 | " |
| Flux of Invention | 61 | 64 | 20 | 8 | 8 | — | — | — | 547.8 | " |
| Flux of Invention | 62 | 26 | 41 | 30 | — | — | — | 3 | 546.1 | " |
| Flux of Invention | 63 | 26 | 40 | 30 | — | — | 4 | — | 546.1 | " |
| Flux of Invention | 64 | 43 | 16 | 13 | 3 | — | 25 | — | 545.3 | " |
| Flux of Invention | 65 | 46 | 17 | 14 | — | 3 | — | 20 | 545.3 | " |

TABLE 3

| Flux | No. | KAlF$_4$ | K$_2$AlF$_5$ | K$_3$AlF$_6$ | AlF(OH)$_2$ | AlFO | AlF$_2$(OH) | Al$_2$F$_4$O | Melting point, (° C.) | Brazeability in N$_2$ atm. |
|---|---|---|---|---|---|---|---|---|---|---|
| Flux of Invention | 66 | 23 | 38 | 26 | 7 | 6 | — | — | 546.1 | " |
| Flux of Invention | 67 | 24 | 45 | 21 | — | — | 3 | 7 | 546.9 | " |
| Flux of Invention | 68 | 43 | 16 | 13 | — | 3 | 25 | — | 545.4 | " |
| Flux of Invention | 69 | 46 | 17 | 14 | 3 | — | — | 20 | 545.3 | " |
| Flux of Invention | 70 | 46 | 17 | 14 | 6 | 5 | 7 | 5 | 546.3 | " |

TABLE 3-continued

| Flux | No. | Composition of Flux (wt %) | | | | | | | Melting point, (° C.) | Brazeability in N$_2$ atm. |
|---|---|---|---|---|---|---|---|---|---|---|
| | | KAlF$_4$ | K$_2$AlF$_5$ | K$_3$AlF$_6$ | AlF(OH)$_2$ | AlFO | AlF$_2$(OH) | Al$_2$F$_4$O | | |
| Flux of Invention | 71 | — | 62 | — | — | 38 | — | — | 545.4 | " |
| Flux of Invention | 72 | — | 60 | — | 40 | — | — | — | 545.8 | " |
| Flux of Invention | 73 | — | 58 | — | — | — | — | 42 | 545.5 | " |
| Flux of Invention | 74 | — | 57 | — | — | — | 43 | — | 545.2 | " |
| Flux of Invention | 75 | — | 59 | — | — | 16 | — | 25 | 545.6 | " |
| Flux of Invention | 76 | — | 57 | — | 14 | — | 29 | — | 545.5 | " |
| Flux of Invention | 77 | — | 59 | — | 24 | 17 | — | — | 545.3 | " |
| Flux of Invention | 78 | — | 58 | — | — | — | 28 | 14 | 545.4 | " |
| Flux of Invention | 79 | — | 56 | — | — | 5 | 39 | — | 545.3 | " |
| Flux of Invention | 80 | — | 58 | — | 5 | — | — | 37 | 545.4 | " |
| Flux of Invention | 81 | — | 58 | — | 9 | 8 | 13 | 12 | 545.4 | " |
| Flux of Invention | 82 | 73 | — | — | — | 27 | — | — | 547.6 | " |
| Flux of Invention | 83 | 75 | — | — | 25 | — | — | — | 547.2 | " |
| Flux of Invention | 84 | 71 | — | — | — | — | — | 29 | 548.0 | " |
| Flux of Invention | 85 | 83 | — | — | — | — | 17 | — | 547.8 | " |
| Flux of Invention | 86 | 75 | — | — | 5 | — | 20 | — | 546.9 | " |
| Flux of Invention | 87 | 72 | — | — | — | 5 | — | 23 | 547.4 | " |
| Flux of Invention | 88 | 70 | — | — | 12 | 18 | — | — | 547.5 | " |
| Flux of Invention | 89 | 84 | — | — | — | — | 8 | 8 | 547.6 | " |
| Flux of Invention | 90 | 81 | — | — | — | 9 | 10 | — | 547.5 | " |
| Flux of Invention | 91 | 77 | — | — | 6 | — | — | 17 | 548.1 | " |
| Flux of Invention | 92 | 81 | — | — | 3 | 2 | 7 | 7 | 547.9 | " |
| Flux of Invention | 93 | — | — | 85 | — | 15 | — | — | 556.0 | " |
| Flux of Invention | 94 | — | — | 81 | 19 | — | — | — | 554.0 | " |
| Flux of Invention | 95 | — | — | 78 | — | — | — | 22 | 552.0 | " |
| Flux of Invention | 96 | — | — | 80 | — | — | 20 | — | 551.5 | " |
| Flux of Invention | 97 | — | — | 64 | 13 | — | 23 | — | 547.0 | " |
| Flux of Invention | 98 | — | — | 79 | — | 5 | — | 16 | 555.0 | " |
| Flux of Invention | 99 | — | — | 83 | 10 | 7 | — | — | 555.2 | " |
| Flux of Invention | 100 | — | — | 79 | — | — | 11 | 10 | 553.0 | " |
| Flux of Invention | 101 | — | — | 79 | 10 | — | — | 11 | 553.1 | " |
| Flux of Invention | 102 | — | — | 82 | — | 9 | 9 | — | 552.6 | " |
| Flux of Invention | 103 | — | — | 80 | 4 | 3 | 7 | 6 | 555.1 | " |

TABLE 4

| Flux | No. | Composition of Flux (wt %) | | | | | | | Melting point, (° C.) | Brazeability in N₂ atm. |
|---|---|---|---|---|---|---|---|---|---|---|
| | | KAlF$_4$ | K$_2$AlF$_5$ | K$_3$AlF$_6$ | AlF(OH)$_2$ | AlFO | AlF$_2$(OH) | Al$_2$F$_4$O | | |
| Flux of Invention | 104 | 41 | 35 | — | — | — | 24 | — | 545.1 | " |
| Flux of Invention | 105 | 42 | 35 | — | — | — | 15 | 8 | 545.2 | " |
| Flux of Invention | 106 | 42 | 36 | — | — | — | — | 22 | 545.5 | " |
| Flux of Invention | 107 | 55 | — | 23 | — | — | — | 22 | 545.7 | " |
| Flux of Invention | 108 | 52 | 30 | — | 18 | — | — | — | 545.3 | " |
| Flux of Invention | 109 | 53 | 30 | — | 13 | 4 | — | — | 545.5 | " |
| Flux of Invention | 110 | 54 | 31 | — | — | 15 | — | — | 545.7 | " |
| Flux of Invention | 111 | 65 | — | 20 | — | 15 | — | — | 546.1 | " |

What is claimed is:

1. A flux for brazing aluminum members characterized in that the flux comprises potassium pentafluoroaluminate and oxyfluoroaluminum.

2. A flux for brazing aluminum members characterized in that the flux comprises potassium pentafluoroaluminate and hydroxyfluoroaluminum.

3. A flux for brazing aluminum members characterized in that the flux comprises potassium pentafluoroaluminate, oxyfluoroaluminum and hydroxyfluoroaluminum.

4. A flux for brazing aluminum members according to any one of claims 1, 2 or 3, further comprising one or more selected from the group consisting of potassium tetrafluoroaluminate and potassium hexafluoroaluminate.

5. A flux for brazing aluminum members characterized in that the flux comprises one or more selected from the group consisting of oxyfluoroaluminum and hydroxyfluoroaluminum in addition to one or more selected from the group consisting of potassium tetrafluoroaluminate and potassium hexafluoroaluminate.

* * * * *